Patented June 12, 1951

2,556,820

UNITED STATES PATENT OFFICE 2,556,820

AQUEOUS DISPERSIONS OF DICHLORO-DIPHENYL-TRICHLOROETHANE

Aubrey H. Nease, Plainfield, N. J., assignor to General Aniline & Film Corporation, New York, N. Y., a corporation of Delaware No Drawing. Application September 21, 1945, Serial No. 617,921

7 Claims. (Cl. 167—30)

The present invention relates to an improved insecticidal composition having as its active ingredient 2,2'-bis-(para-chloro-phenyl)-1,1,1-trichloroethane, commonly known as dichloro-diphenyl-trichloroethane (DDT).

While insecticidal compositions which contain as the active ingredient 2,2'-bis-(para-chlorophenyl)-1,1,1-trichloro-ethane, which will hereinafter be referred to as dichloro-diphenyl-trichloroethane, have found extensive use, it has heretofore been necessary when it has been desired to employ aqueous sprays of this material, to first dissolve it in a volatile, water immiscible organic solvent, such as kerosene and other petroleum fractions, xylene, mixtures of alkylated naphthylenes and the like, and then emulsify the thus-formed solution. While many efforts have been made to produce satisfactory dispersions of this compound in water without the use of such organic solvents, satisfactory dispersions of this type have not heretofore been available.

I have now produced satisfactory dispersions of dichloro-diphenyl-trichloroethane in water without the use of such organic solvents by employing, as the dispersing agent, a water-soluble condensation product of an alkylene oxide and a water-insoluble organic compound containing 6 or more carbon atoms selected from the group consisting of carboxylic acids, organic hydroxy compounds, amines, and carboxylic acid amides.

The thus-formed dispersions of dichloro-diphenyl-trichloroethane are suitable for use as an insecticide in practically all instances where the previously known emulsions of an organic solvent and dichloro-diphenyl-trichloroethane could be employed, and in addition, possess certain advantages over such prior art emulsions and are more suitable for use in certain instances. Thus the dispersions of the present invention may be employed as an insecticide upon a wide variety of plants on which the prior art emulsions are undesirable due to the deleterious effect of the organic solvent on the plant, particularly the foliage. By employing dichloro-diphenyl-trichloroethane in the form of the dispersions of the present invention, the dangers of toxicity to animal life are minimized, since there is no organic solvent present to aid its penetration through the skin. In addition, the dispersions of the present invention have no noticeable odor and are therefore more acceptable for household and similar use.

The dispersing agents which I have found to be valuable for use in the present invention are from readily to difficultly water-soluble condensation products of an alkylene oxide and a water-insoluble monomeric organic compound having a reactive hydrogen atom selected from the group consisting of hydroxyl, carboxyl, amino and amido compounds containing at least 6 carbon atoms. Suitable compounds of this type are described in United States Patents No. 1,970,578 and No. 2,085,706 to Schoeller and Wittwer and No. 2,213,477 to Steindorff. These polyalkylene oxide condensation products may be obtained by reacting at least 4 and preferably 10–30 or even more, such as 50–100 mols, of an alkylene oxide, such as ethylene oxide, propylene oxide and their higher homologues, with such hydroxyl compounds as hexyl, cyclohexyl, octyl, dodecyl, octodecyl, cetyl, oleyl, and alcohols obtainable by hydrogenation of animal and vegetable oils and fats, or benzyl and especially alkyl benzyl alcohols or phenols, especially alkyl phenols, such as butyl phenol, and more particularly alkyl phenols in which the alkyl group contains at least 6 carbon atoms, for instance diisobutyl phenol, isooctyl $\beta$-naphthol and the like; or such carboxyl compounds as lauric, oleic, linoleic, palmitic, stearic, hydroxystearic and naphthenic acids, or the acids obtained by the oxidation of paraffin wax or oil and acids of animal or vegetable origin; or such amines as decylamine, dodecylamine, cetylamine, octodecylamine, diheptylamine and diphenylamine, or alkylolamines, such as N-cyclohexyl-N-mono- or di-ethanol or propanolamines or their higher homologues; while as examples of suitable carboxylic acid amides may be cited the amides of such carboxylic acids as $\alpha$- or $\beta$-naphthoic, lauric, oleic, palmitic or stearic acids.

In preparing the dispersions of the present invention, the dichloro-diphenyl-trichloroethane is preferably mixed with the dispersing agent and the mixture heated, with stirring, until the dichloro-diphenyl-trichloroethane is completely dissolved. In general, a temperature of at least 50–60° C. is necessary in order to secure complete miscibility within a reasonable time. The exact temperature to be employed will depend to some extent upon the purity of the dichloro-diphenyl-trichloroethane employed in the composition. I have found that temperatures of 70–80° C. are satisfactory when employing commercially available, technical dichloro-diphenyl-trichloroethane. The thus-formed solution, or melt, of dispersing agent and dichloro-diphenyl-trichloroethane is then added to water, preferably warm water; i. e. at approximately 50–80° C., with constant stirring. There is thus obtained a dispersion of dichloro-diphenyl-trichloroethane in water which is quite stable and in which any material which precipitates on long standing can be readily redispersed by shaking or stirring. Although it is preferred to add the melt to water, if desired, the water may be added to the melt and in this case, a precipitate forms rather quickly. However, continued agitation or stirring will disperse this precipitate and a satisfactorily stable dispersion is thus obtained in which any material which precipitates on long standing may be readily redispersed by shaking or slight stirring.

In preparing the dispersions embodied in the present invention, I employ from 20–50% of dispersing agent, based on the amount of dichloro-diphenyl-trichloroethane. Higher amounts, 100% or higher, of dispersing agent can be employed if desired, but in general, are uneconomical. On the other hand, when smaller amounts of dispersing agent are employed, the dispersions formed are relatively unstable and any precipitate which forms on long storage is not readily redispersed.

The amount of water employed in producing these dispersions will depend on the amount of dichloro-diphenyl-trichloroethane desired in the final dispersion. In general, it is recommended that about 5% of the active ingredient (dichloro-diphenyl-trichloroethane) be present in the dispersion when it is used. It is generally preferred, however, to prepare a more concentrated dispersion for storage or sale and to dilute this concentrated dispersion immediately before use with such additional quantity of water as is required to give a dispersion of the desired strength. I have found that dispersions containing approximately 1–2 parts of water by weight for each part of combined dispersing agent and dichloro-diphenyl-trichloroethane are quite stable and remain liquid under usual storage conditions. While some sedimentation may occur on long standing, homogeneity can be restored easily by shaking or stirring. Somewhat smaller amounts of water may be employed. However, in this case, the dispersion tends to solidify at room temperature and is, therefore, somewhat more difficult to dilute with additional water for use.

The following examples illustrate preferred embodiments of the present invention which, however, is not limited thereto; the parts are by weight:

*Example 1*

20 parts of dichloro-diphenyl-trichloroethane and 10 parts of a condensation product of isooctyl phenol with from 10–20 mols of ethylene oxide were heated together, with stirring, at 70–80° C. until the dichloro-diphenyl-trichloroethane was completely dissolved. The thus-formed solution was then slowly added to 60 parts of water at a temperature of 50–60° C. and thoroughly stirred until a uniform, milky dispersion was obtained. The dispersion was bottled and was stable on storage for 4 months. For use as an insecticide, 1 part of the dispersion was diluted with 3 parts of water and employed as an insecticidal spray with good results.

*Example 2*

1 part of a condensation product of oleyl alcohol with from 10–20 mols of ethylene oxide and 5 parts of dichloro-diphenyl-trichloroethane were heated together at from 70–80° C. until a clear solution was obtained. The thus-formed solution was then added to 100 parts of water at 50–60° C. with stirring. There was thus obtained a dispersion of approximately 5% dichloro-diphenyl-trichloroethane in water which was stable on storage for several days. The dispersion was used in this form as an insecticidal spray with good results.

I claim:

1. An insecticidal composition consisting of a stable readily water-miscible aqueous dispersion in from 1–20 parts of water, of 1 part of a composition consisting of 2,2'-bis-(parachloro-phenyl)-1,1,1-trichloroethane with from 20–50% by weight thereof of a dispersing agent consisting of a water-soluble nonionic polyglycol ether surface active agent.

2. A composition of matter as defined in claim 1, wherein said dispersing agent is a polyalkylene oxide condensation product of an organic carboxylic acid containing at least six carbon atoms.

3. A composition of matter as defined in claim 1, wherein said dispersing agent is a polyalkylene oxide condensation product of a monomeric organic hydroxy compound containing at least six carbon atoms.

4. A composition of matter as defined in claim 3, wherein the organic hydroxy compound is a long-chain aliphatic alcohol.

5. A composition of matter as defined in claim 3, wherein the organic hydroxy compound is oleyl alcohol.

6. A composition of matter as defined in claim 3, wherein the organic hydroxy compound is an alkyl phenol containing at least six alkyl carbon atoms.

7. A process for obtaining an emulsion of particles of technical 1,1,1-trichloro-2,2-bis(p-chloro-phenyl)ethane, said process comprising incorporating into molten, technical 1,1,1-trichloro-2,2-bis(p-chlorophenyl)ethane about 20% by weight thereof of a non-ionic surface-active agent which contains a polyoxyalkylene ether chain and which is soluble in molten 1,1,1-trichloro-2,2-bis(p-chlorophenyl)ethane, and pouring the molten mixture with agitation into water having a temperature of about 50° C., thereby obtaining said emulsion.

AUBREY H. NEASE.

REFERENCES CITED

The following references are of record in the file of this patent:

UNITED STATES PATENTS

| Number | Name | Date |
|---|---|---|
| 1,970,578 | Scholler et al. | Aug. 21, 1934 |
| 2,085,706 | Scholler et al. | June 29, 1937 |
| 2,213,477 | Steindorff | Aug. 27, 1940 |
| 2,423,457 | Lynn | July 8, 1947 |

FOREIGN PATENTS

| Number | Country | Date |
|---|---|---|
| 547,874 | Great Britain | Sept. 15, 1942 |

OTHER REFERENCES

Wells: J. Economic Entomology, vol. 37, No. 1, Feb. 1944, pages 136, 137.

Gahan: Ibid, page 139.